US012137258B2

(12) United States Patent
Miller et al.

(10) Patent No.: US 12,137,258 B2
(45) Date of Patent: *Nov. 5, 2024

(54) GEOLOCATIONING SYSTEM AND METHOD FOR USE OF SAME

(71) Applicant: Enseo, LLC, Plano, TX (US)

(72) Inventors: Thomas R. Miller, Plano, TX (US); William C. Fang, Plano, TX (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,736

(22) Filed: Aug. 23, 2022

(65) Prior Publication Data

US 2022/0408119 A1    Dec. 22, 2022

Related U.S. Application Data (63) Continuation of application No. 17/105,126, filed on Nov. 25, 2020, now Pat. No. 11,425,428, which is a
(Continued)

(51) Int. Cl.
*H04N 21/214* (2011.01)
*G07C 1/00* (2006.01)
(Continued)

(52) U.S. Cl.
CPC .......... *H04N 21/2143* (2013.01); *G07C 1/00* (2013.01); *H04B 17/318* (2015.01); *H04N 21/23605* (2013.01); *H04N 21/25841* (2013.01); *H04N 21/4108* (2013.01); *H04N 21/414* (2013.01); *H04N 21/42221* (2013.01); *H04N 21/4343* (2013.01); *H04N 21/43637* (2013.01);
(Continued)

(58) Field of Classification Search
CPC ......... H04N 21/4516; H04N 21/43637; H04N 21/2143; H04N 21/25841; H04N 21/4343; H04N 21/4524; H04N 21/4108; H04N 21/414; H04N 21/42221; H04N 21/23605; G07C 1/00; H04W 84/12
See application file for complete search history.

(56) References Cited

U.S. PATENT DOCUMENTS

9,332,304 B2    5/2016  Ogle et al.
9,344,757 B2    5/2016  Ogle et al.
(Continued)

*Primary Examiner* — Yassin Alata
(74) *Attorney, Agent, or Firm* — Scott Griggs; Griggs Bergen LLP (57) ABSTRACT

A geolocationing system and method for providing awareness in a multi-space environment, such as a hospitality environment or educational environment, are presented. In one embodiment of the geolocationing system, a vertical and horizontal array of gateway devices is provided. Each gateway device includes a gateway device identification providing an accurately-known fixed location within the multi-space environment. Each gateway device includes a wireless transceiver that receives a beacon signal from a proximate wireless-enabled personal locator device. The gateway devices, in turn, send gateway signals to a server, which determines estimated location of the wireless-enabled personal location device with trilateration and received signal strength modeling.

20 Claims, 7 Drawing Sheets

Related U.S. Application Data continuation-in-part of application No. 16/825,594, filed on Mar. 20, 2020, now Pat. No. 11,284,120, and a continuation of application No. 16/600,853, filed on Oct. 14, 2019, now abandoned, said application No. 16/825,594 is a continuation of application No. 16/201,783, filed on Nov. 27, 2018, now Pat. No. 10,602,196, which is a continuation of application No. 15/652,622, filed on Jul. 18, 2017, now Pat. No. 10,142,662, which is a continuation of application No. 15/165,851, filed on May 26, 2016, now Pat. No. 9,712,872, which is a continuation of application No. 14/461,479, filed on Aug. 18, 2014, now Pat. No. 9,357,254.

(60) Provisional application No. 62/750,980, filed on Oct. 26, 2018, provisional application No. 61/935,862, filed on Feb. 5, 2014.

(51) Int. Cl.
| | | |
|---|---|---|
| *H04B 17/318* | (2015.01) | |
| *H04N 21/236* | (2011.01) | |
| *H04N 21/258* | (2011.01) | |
| *H04N 21/41* | (2011.01) | |
| *H04N 21/414* | (2011.01) | |
| *H04N 21/422* | (2011.01) | |
| *H04N 21/434* | (2011.01) | |
| *H04N 21/4363* | (2011.01) | |
| *H04N 21/45* | (2011.01) | |
| *H04W 4/029* | (2018.01) | |
| *H04W 4/90* | (2018.01) | |
| *H04W 84/12* | (2009.01) | |
| *H04W 88/16* | (2009.01) | |

(52) U.S. Cl.
CPC ..... *H04N 21/4516* (2013.01); *H04N 21/4524* (2013.01); *H04W 4/029* (2018.02); *H04W 4/90* (2018.02); *H04W 84/12* (2013.01); *H04W 88/16* (2013.01)

(56) References Cited

U.S. PATENT DOCUMENTS

| | | |
|---|---|---|
| 9,357,254 B2 | 5/2016 | Ogle et al. |
| 9,654,826 B2 | 5/2017 | Ogle et al. |
| 9,654,827 B2 | 5/2017 | Ogle et al. |
| 9,712,872 B2 | 7/2017 | Ogle et al. |
| 9,800,932 B2 | 10/2017 | Ogle et al. |
| 9,832,490 B2 | 11/2017 | Ogle et al. |
| 10,091,534 B2 | 10/2018 | Ogle et al. |
| 10,104,402 B2 | 10/2018 | Ogle et al. |
| 10,142,662 B2 | 11/2018 | Ogle et al. |
| 10,602,196 B2 | 3/2020 | Ogle et al. |
| 2009/0147697 A1 | 6/2009 | Malik et al. |
| 2011/0099575 A1 | 4/2011 | Woo et al. |
| 2015/0221199 A1* | 8/2015 | Ogle .............. G07C 1/00 725/80 |
| 2017/0280301 A1* | 9/2017 | Chang ............. H04W 4/024 |
| 2017/0318341 A1 | 11/2017 | Ogle et al. |
| 2018/0077459 A1 | 3/2018 | Ogle et al. |
| 2019/0037248 A1 | 1/2019 | Ogle et al. |
| 2019/0045229 A1 | 2/2019 | Ogle et al. |
| 2019/0098340 A1 | 3/2019 | Ogle et al. |
| 2020/0137524 A1 | 4/2020 | Miller et al. |
| 2021/0160546 A1 | 5/2021 | Miller et al. |

* cited by examiner

GEOLOCATIONING SYSTEM AND METHOD FOR USE OF SAME

PRIORITY STATEMENT & CROSS-REFERENCE TO RELATED APPLICATION

This application is a continuation of U.S. patent application Ser. No. 17/105,126, entitled "Geolocationing System and Method for Use of Same" filed on Nov. 25, 2020 in the names of Thomas R. Miller et al., now U.S. Pat. No. 11,425,428 and issued on Aug. 23, 2022; which is a continuation of U.S. patent application Ser. No. 16/600,853, entitled "Geolocationing System and Method for Use of Same," filed on Oct. 14, 2019, in the names of Thomas R. Miller et al.; which claims the benefit of U.S. Patent Application Ser. No. 62/750,980 entitled "Geolocationing System and Method for Use of Same" filed on Oct. 26, 2018, in the name of William C. Fang; all of which are hereby incorporated by reference, in entirety, for all purposes. U.S. patent application Ser. No. 17/105,126 is also a continuation-in-part of U.S. patent application Ser. No. 16/825,594, entitled "Set-Top Box, System and Method for Providing Awareness in a Hospitality Environment," filed on Mar. 20, 2020, in the names of Vanessa Ogle et al., now U.S. Pat. No. 11,284,120 and issued on Mar. 22, 2022; which is a continuation of U.S. patent application Ser. No. 16/201,783 entitled "Set-Top Box, System and Method for Providing Awareness in a Hospitality Environment" filed on Nov. 27, 2018, in the names of Vanessa Ogle et al., now U.S. Pat. No. 10,602,196 and issued on Mar. 24, 2020; which is a continuation of U.S. patent application Ser. No. 15/652,622 entitled "Set-Top Box, System and Method for Providing Awareness in a Hospitality Environment" filed on Jul. 18, 2017, in the names of Vanessa Ogle et al., now U.S. Pat. No. 10,142,662 and issued on Nov. 27, 2018; which is a continuation of U.S. patent application Ser. No. 15/165,851 entitled "Set-Top Box, System and Method for Providing Awareness in a Hospitality Environment" filed on May 26, 2016, in the names of Vanessa Ogle et al., now U.S. Pat. No. 9,712,872 and issued on Jul. 18, 2017; which is a continuation of U.S. patent application Ser. No. 14/461,479 entitled "Set-Top Box, System and Method for Providing Awareness in a Hospitality Environment" filed on Aug. 18, 2014, in the names of Vanessa Ogle et al., now U.S. Pat. No. 9,357,254, issued on May 31, 2016; which claims priority from U.S. Patent Application Ser. No. 61/935,862 entitled "System and Method for Providing Awareness in a Hospitality Environment" and filed on Feb. 5, 2014, in the name of Vanessa Ogle; all of which are hereby incorporated by reference, in entirety, for all purposes.

TECHNICAL FIELD OF THE INVENTION

This invention relates, in general, to geolocationing and, in particular, to enhanced performance in systems and methods for providing awareness and safety in a multiroom environment such as a hospitality environment, educational environment, or the like.

BACKGROUND OF THE INVENTION

Without limiting the scope of the present invention, the background will be described in relation to employee safety in hospitality environments, as an example. Employees face increased personal security risks at work in multiroom environments such as hospitality environments, which include motels, hotels, and the like, for example. Such hospitality industry employees often work alone and range over large interior areas that may be divided into many small, closed spaces. As a result of limited existing security measures, there is a need for improved systems and methods of providing awareness and safety in hospitality environments.

SUMMARY OF THE INVENTION

It would be advantageous to achieve systems and methods for providing geolocationing in a multiroom environment such as a hospitality environment, educational environment, or the like that would improve upon existing limitations in functionality. It would be desirable to enable an electrical engineering-based and software solution that would provide enhanced awareness and safety in an easy-to-use platform in the hospitality lodging industry or in another environment. To better address one or more of these concerns, a geolocationing system and method for use of the same are disclosed.

In one embodiment of the geolocationing system, a vertical and horizontal array of gateway devices is provided. Each gateway device includes a gateway device identification providing an accurately-known fixed location within the multi-space environment. Each gateway device includes a wireless transceiver that receives a beacon signal from a proximate wireless-enabled personal locator device. The gateway devices, in turn, send gateway signals to a server, which determines estimated location of the wireless-enabled personal location device with trilateration and received signal strength modeling. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
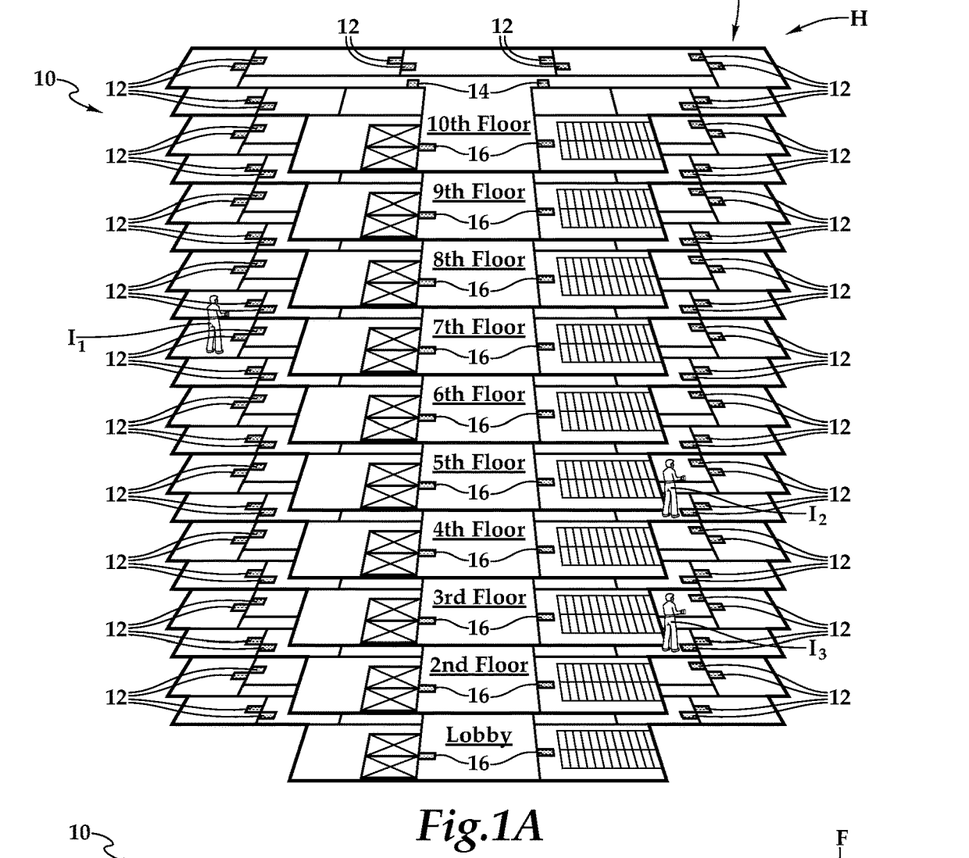
FIG. 1A is schematic building diagram depicting one embodiment of a geolocationing system for providing awareness in a multiroom environment illustrated as a hotel, according to the teachings presented herein.
Figure 1B:
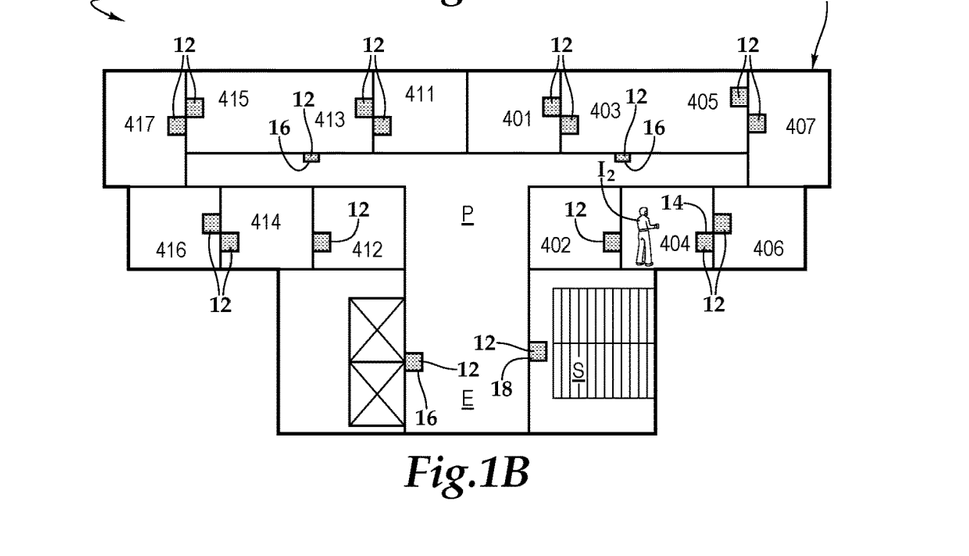
FIG. 1B is a schematic floor plan depicting a floor of the hotel presented in FIG. 1A in further detail.
Figure 2:
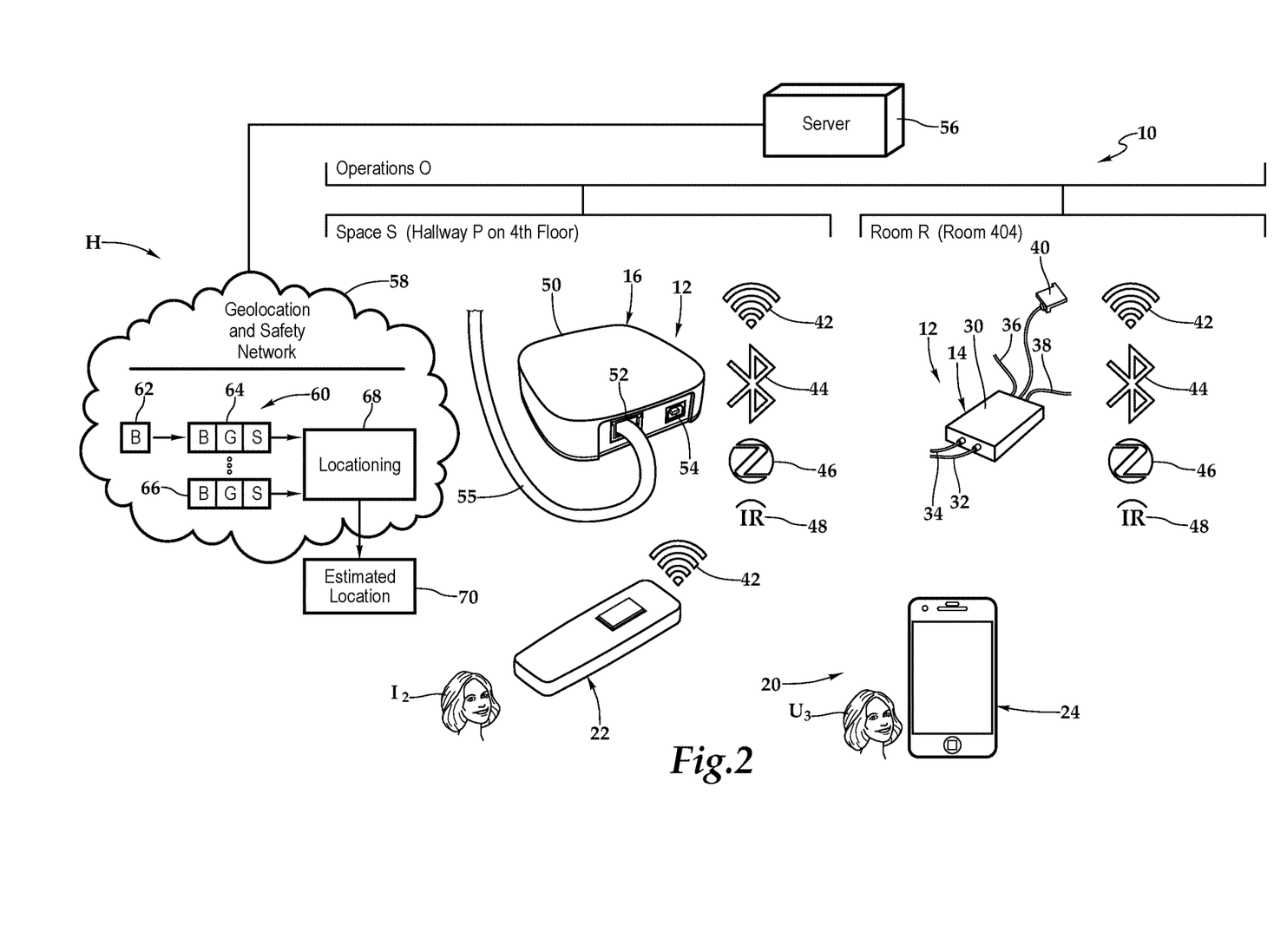
FIG. 2 is schematic diagram depicting one embodiment of the geolocationing system presented in FIG. 1A providing enhanced awareness and safety functionality therewith according to the teachings presented herein.

Referring initially to FIGS. 1A, 1B and 2, therein is depicted a geolocationing system for providing awareness in a multi-space environment such as a hospitality environment, which may be as a furnished multi-family residence, dormitory, lodging establishment, hotel, hospital, which is schematically illustrated and designated 10. The multi-space environment may also be a multi-unit environment such as an educational environment like a school or college campus, for example. More generally, the geolocationing system 10 and the teachings presented herein are applicable to any multi-space environment including hospitality environments, educational campuses, hospital campuses, office buildings, multi-unit dwellings, sport facilities and shopping malls, for example.

As shown, by way of example and not by way of limitation, the multi-space environment is depicted as a hotel H having a lobby and floors F, which are appropriately labeled the $2^{nd}$ floor through the $10^{th}$ floor. Further, by way of example, the $4^{th}$ floor is depicted with rooms 401, 402, 403, 404, 405, 406, 407, 411, 412, 413, 414, 415, 416, and 417. Additionally, a common area near the elevators is labeled E, a hallway labeled P, and a stairwell is labeled S. The lobby, the common area E, the hallway P, and the stairwell S are further illustrations of spaces in the multi-space environment in addition to the rooms.

Gateway devices 12 are deployed as part of a horizontal and vertical array, which is generally a spatial array, throughout the hotel H. It should be appreciated, however, that the gateway devices 12 and more generally deployment of the system may include a horizontal array. Further, the deployment may be in a single story, multiple stories, or a combination thereof. As will be discussed in further detail hereinbelow, the gateway devices may include set-top boxes 14, a gateway service devices 16, or a common space gateway device 18.

Individuals, such as $I_1$, $I_2$, $I_3$ carry personal locator devices 20 which periodically, or on demand, transmit beacons that are received by a gateway device 16. The personal locator devices 20 may be a single button personal locator device 22 or a wireless-enabled interactive programmable device 24, such as a smart watch, a smart phone, or a tablet computer, for example. In one embodiment, the wireless-enabled interactive programmable device 24 may be a wireless-enabled smart and interactive handheld device that may be supplied or carried by the user or guest. As shown individual $I_1$ works in the hospitality industry at hotel H and is presently working on the $4^{th}$ floor. As the individual $I_1$ is working in room 404, the personal locator device 22 is transmitting beacons that are received by gateway devices 12, such as the set-top box 14 that is located within the room 404 and the gateway service device 16 located in hallway P on the $4^{th}$ floor of the hotel H.

As shown, the gateway device in the room 404 is a set-top box 14, which may be connected to an electronic visual display device such as a display or television. The set-top box 14 includes a housing 30 and a connection, which is depicted as an HDMI connection 32, connects the set-top box 14 to the display (not shown). Other connections include a power cable 34 coupling the set-top box 14 to a power source, a coaxial cable 36 coupling the set-top box 14 to an external cable source, and a category five (Cat 5) cable 38 coupling the set-top box 14 to an external pay-per-view source, for example. As shown, the set-top box 14 may include a dongle 40 providing particular technology and functionality extensions thereto. That is, the set-top box 14 may be set-top box-dongle combination in one embodiment. More generally, it should be appreciated that the cabling connected to the set-top box 14 will depend on the environment and application, and the cabling connections presented in FIG. 2 are depicted for illustrative purposes. Further, it should be appreciated that the positioning of the set-top box 14 will vary depending on environment and application and, with certain functionality, the set-top box 14 may be placed more discretely behind the display 14 or as an in-wall mount. At least one antennas associated with the set-top box 14 provides for the wireless capabilities of the gateway device 12 and include, for example, wireless standards: Wi-Fi 42, Bluetooth 44, ZigBee 46, infrared 48.

As mentioned, the gateway device 12 in the hallway P of the $4^{th}$ floor is a gateway service device 16 having a housing 50 with physical connection ports 52, 54. A network cable 56, which is depicted as a category five (Cat 5) cable 56, is secured to physical connection port 52. Multiple antennas provide for the wireless capabilities of the gateway device 12 and include, for example, wireless standards: Wi-Fi 42, Bluetooth 44, ZigBee 46, and IR 48. More generally, it should be appreciated that the cabling connected to the gateway device 12 and antenna configuration will depend on the environment and application and the cabling connections and wireless standards presented in FIG. 2 are depicted for illustrative purposes. Although not shown in FIG. 2, the common space gateway device 18 may be similar in appearance to the gateway service device 16.

As shown, each of the gateway devices 12, including the set-top box 14 and the gateway service device 16 of FIG. 2, have a data link to the server 58 which is providing a geolocation and safety network 56. In one implementation, an individual 12 has the personal location device, which may transmit a beacon from the personal location device 20 using a wireless standard such as WiFi 42 to the gateway devices 12. Each of the gateway devices 12, including the set-top box 14 and the gateway service device 16, then processes the received beacon signal and sends a gateway signal to the server 56. More particularly, with respect to data flow 60, the personal locator device 20, which is the single button personal locator 22, transmits the beacon signal 62 which includes a personal location device identification identifying the personal locator device 20. The beacon signal 62 is received by each of the gateway devices 12 which transmit broadcast signals 64, 66 including the personal location device identification, a gateway device identification identifying the gateway device 12, and a signal characteristic indicator, such as signal strength, for example. The server 56 receives the broadcast signal 64 and uses multiple broadcast signals, including the broadcast signals 64, 66, for locationing 68, for determining the estimated location 70 of the personal location device 20 of the individual 12. The server 56, in turn, sends out the appropriate notifications to various phones, activates alarms, or notify others via a computer, depending on the situation. As a spatial array of horizontal and vertical gateway devices 12 are provided, the server 56 and system 10 presented herein is able to determine the location of the individual associated with the personal location device 20 within a building. The estimated location 70 includes which floor the individual is presently located as well as the room or common area.

Figure 3A:
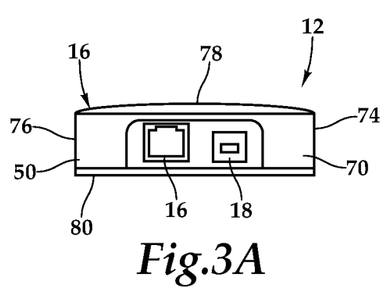
FIG. 3A is a top plan view of one embodiment of a gateway device depicted in FIG. 1 in further detail.
Figure 3B:
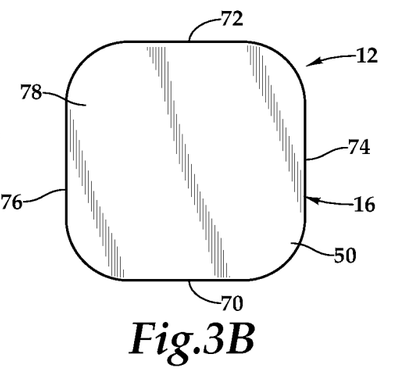
FIG. 3B is a front elevation view of the gateway device depicted in FIG. 3A.
Figure 4:
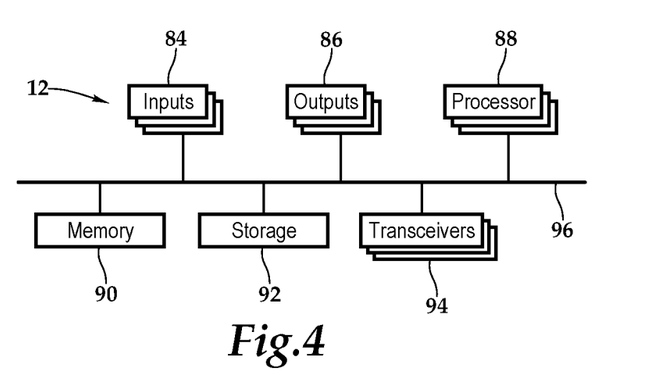
FIG. 4 is a functional block diagram depicting one embodiment of the gateway device presented in FIGS. 2A and 2B.

Referring to FIG. 3A, FIG. 3B, and FIG. 4, the gateway device 12 may be a set-top unit that is an information appliance device that does not include television-tuner functionality and generally contains convenience and safety functionality. The gateway service device 16 includes the housing 50 having a front wall 72, rear wall 74, side wall 76, side wall 78, top wall 80, and bottom base 82. It should be appreciated that front wall, rear wall, and side wall are relative terms used for descriptive purposes and the orientation and the nomenclature of the walls may vary depending on application. The front wall 72 includes various ports, including the ports 52, 54 that provide interfaces for various interfaces, including inputs 84 and outputs 86. In one implementation, as illustrated, the port 52 is an RJ45 port and port 54 is a USB2 port. It should be appreciated that the configuration of ports may vary with the gateway device depending on application and context.

Within the housing 50, a processor 96, memory 98, storage 100, the inputs 84, and the outputs 86 are interconnected by a bus architecture 102 within a mounting architecture. The processor 96 may process instructions for execution within the computing device, including instructions stored in the memory 98 or in storage 100. The memory 98 stores information within the computing device. In one implementation, the memory 98 is a volatile memory unit or units. In another implementation, the memory 98 is a non-volatile memory unit or units. Storage 100 provides capacity that is capable of providing mass storage for the gateway device 12. Various inputs 92 and outputs 94 provide connections to and from the computing device, wherein the inputs 92 are the signals or data received by the gateway device 12, and the outputs 94 are the signals or data sent from the gateway device 12.

Multiple transceivers 104 are associated with the gateway device 12 and communicatively disposed with the bus 102. As shown the transceivers 104 may be internal, external, or a combination thereof to the housing. Further, the transceivers 104 may be a transmitter/receiver, receiver, or an antenna for example. Communication between various amenities in the hotel room and the gateway device 12 may be enabled by a variety of wireless methodologies employed by the transceiver 152, including 802.11, 802.15, 802.15.4, 3G, 4G, Edge, Wi-Fi, ZigBee, near field communications (NFC), Bluetooth low energy and Bluetooth, for example. Also, infrared (IR) may be utilized.

The memory 98 and storage 100 are accessible to the processor 96 and include processor-executable instructions that, when executed, cause the processor 96 to execute a series of operations. With respect to the processor-executable instructions, the processor is caused to receive and process a beacon signal including a personal location device identification. More particularly, the processor-executable instructions cause the processor to receive a beacon signal via the wireless transceiver from a proximate wireless-enabled personal locator device. The processor-executable instructions then cause the processor to measure received signal strength of the beacon signal. The instructions may then cause the processor 96 to generate a gateway signal including the personal location device identification, a gateway device identification, and signal characteristics indicator, including received signal strength. Finally, the instructions may cause the processor 96 to send the gateway signal to the server 56.

Referring to FIG. 5A, FIG. 5B, FIG. 5C, and FIG. 6, as used herein, set-top boxes, back boxes and set-top/back boxes may be discussed as set-top boxes. By way of example, the set-top box 14 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

Figure 5A:
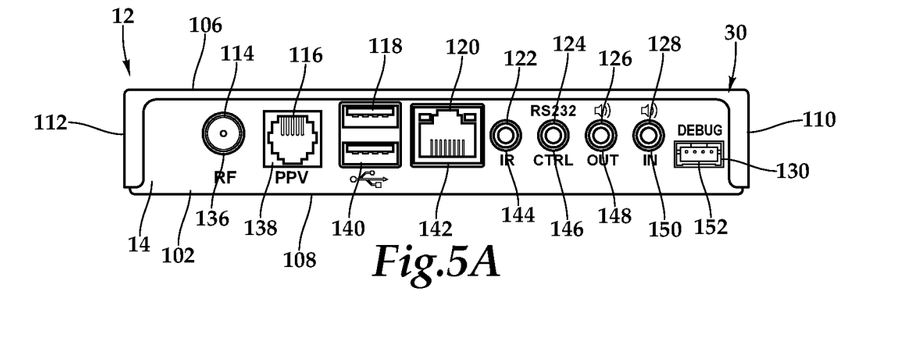
FIG. 5A is a wall-facing exterior elevation view of one embodiment of the set-top box depicted in FIG. 1 in further detail.
Figure 5B:
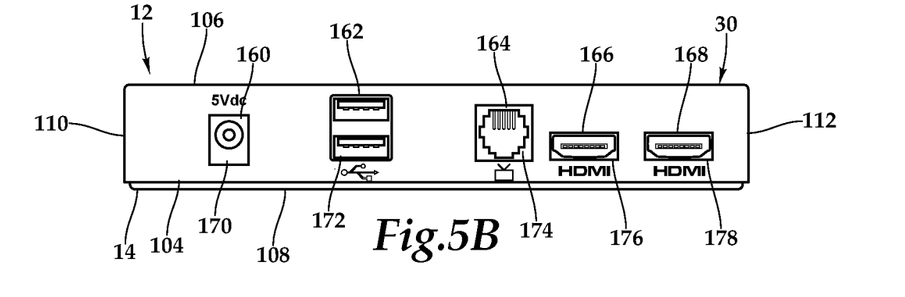
FIG. 5B is a display-facing exterior elevation view of the set-top box depicted in FIG. 1.
Figure 5C:
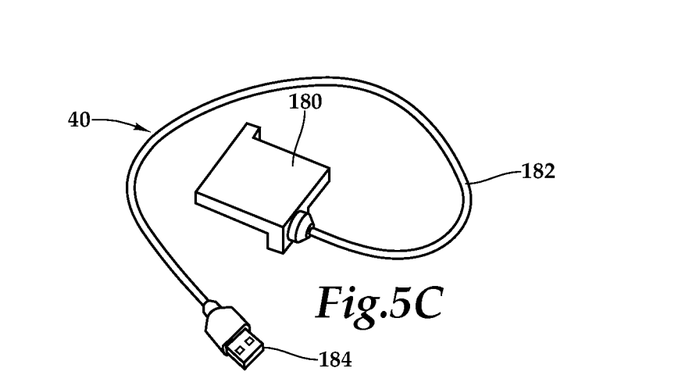
FIG. 5C is a front perspective view of a dongle depicted in FIG. 1 in further detail.

The set-top box 14 includes a housing 30 including a panel 100 and a rear wall 102, front wall 104, top wall 106, bottom base 108, and two sidewalls 110, 112. It should be appreciated that front wall, rear wall, and side wall are relative terms used for descriptive purposes and the orientation and the nomenclature of the walls may vary depending on application. The front wall includes various ports, ports 114, 116, 118, 120, 122, 124, 126, 128 and 130 that provide interfaces for various interfaces, including inputs 132 and outputs 134. In one implementation, as illustrated, the ports 114 through 130 include inputs 132 and outputs 134 and, more particularly, an RF input 136, a RJ-45 input 138, universal serial bus (USB) input/outputs 140, an Ethernet category 5 (Cat 5) coupling 142, an internal reset 144, an RS232 control 146, an audio out 148, an audio in 150, and a debug/maintenance port 152. The front wall 104 also includes various inputs 132 and outputs 134. More particularly, ports 160, 162, 164, 166, 168 include a 5V dc power connection 170, USB inputs/outputs 172, an RJ-45 coupling 174, an HDMI port 176 and an HDMI port 178. It should be appreciated that the configuration of ports may vary with the set-top box depending on application and context. As previously alluded to, the housing 18 may include a housing-dongle combination including, with respect to the dongle 30, a unit 180 having a cable 182 with a set-top box connector 184 for selectively coupling with the set-top box 12.

Figure 6:
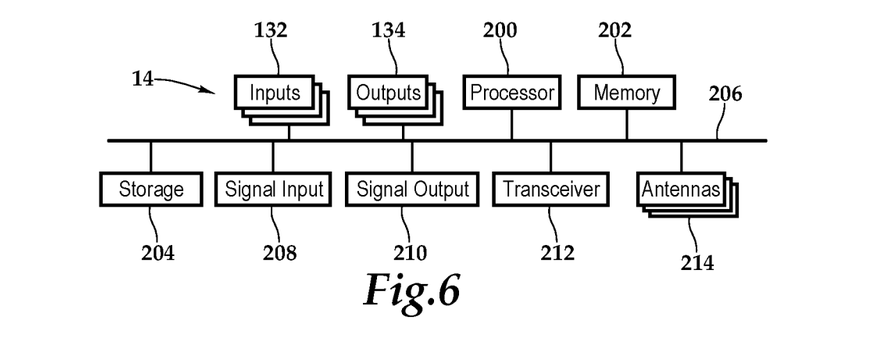
FIG. 6 is a functional block diagram depicting one embodiment of the set-top box presented in FIGS. 3A and 3B.

Within the housing 18, a processor 200, memory 202, storage 204, the inputs 132, and the outputs 134 are interconnected by a bus architecture 206 within a mounting architecture. It should be understood that the processor 200, the memory 202, the storage 204, the inputs 132, and the outputs 134 may be entirely contained within the housing 18 or the housing-dongle combination. The processor 200 may process instructions for execution within the computing device, including instructions stored in the memory 202 or in storage 204. The memory 202 stores information within the computing device. In one implementation, the memory 202 is a volatile memory unit or units. In another implementation, the memory 202 is a non-volatile memory unit or units. Storage 204 provides capacity that is capable of providing mass storage for the set-top box 12. Various inputs 132 and outputs 134 provide connections to and from the computing device, wherein the inputs 132 are the signals or data received by the set-top box 12, and the outputs 134 are the signals or data sent from the set-top box 12. A television content signal input 208 and a television output 210 are also secured in the housing 18 in order to receive content from a source and forward the content, including external content such as cable and satellite and pay-per-view (PPV) programming, to the display.

A transceiver 212 is associated with the set-top box 12 and communicatively disposed with the bus 206. As shown the transceiver 212 may be internal, external, or a combination thereof to the housing 18. Further, the transceiver 212 may be a transmitter/receiver, receiver, or an antenna for example. Communication between various devices and the set-top box 12 may be enabled by a variety of wireless methodologies employed by the transceiver 212, including 802.11, 3G, 4G, Edge, WiFi, ZigBee, near field communications (NFC), Bluetooth low energy and Bluetooth, for example. Also, infrared (IR) may be utilized.

One or more wireless communication antennas 214 are associated with the set-top box 12 and communicatively disposed with the bus 206. As shown the wireless communication antenna 214 may be internal, external, or a combination thereof to the housing 18. Further, the wireless communication antenna 214 may be a transmitter/receiver, receiver, or an antenna for example. Communication from the set-top box 12 to one or more of the proximate wireless-enabled programmable interactive devices 52, 54, 56 may be enabled by a variety of wireless methodologies employed by the wireless communication antennas 214, including 802.11, 3G, 4G, Edge, WiFi, ZigBee, near field communications (NFC), Bluetooth low energy and Bluetooth, for example. Also, infrared (IR) may be utilized. In one implementation, the one or more wireless communication antennas 214 utilize a network connection protocol such as Bluetooth and the one or more wireless communication antennas 214 are Bluetooth transmitters.

The memory 202 and storage 204 are accessible to the processor 200 and include processor-executable instructions that, when executed, cause the processor 200 to execute a series of operations. With respect to the processor-executable instructions, the processor is caused to receive and process a beacon signal including a personal location device identification. More particularly, the processor-executable instructions cause the processor to receive a beacon signal via the wireless transceiver from a proximate wireless-enabled personal locator device. The processor-executable instructions then cause the processor to measure received signal strength of the beacon signal. The instructions may then cause the processor 96 to generate a gateway signal including the personal location device identification, a gateway device identification, and signal characteristics indicator, including received signal strength. Finally, the instructions may cause the processor 96 to send the gateway signal to the server 56.

Figure 7:
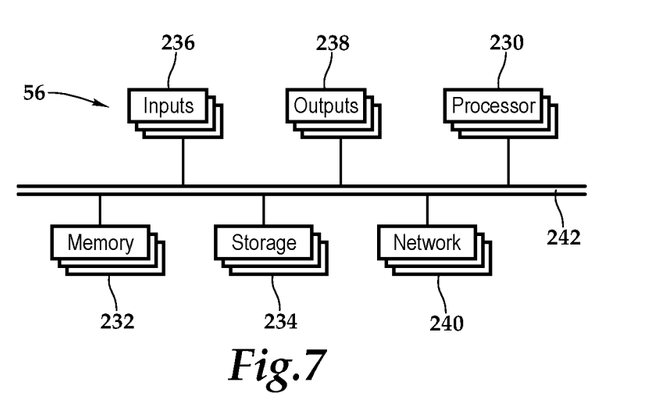
FIG. 7 is a functional block diagram depicting one embodiment of the server presented in FIG. 2.

Referring now to FIG. 7, one embodiment of the server 56 as a computing device includes a processor 230, memory 232, storage 234, inputs 236, outputs 238, and a network adaptor 240 interconnected with various buses 242 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 230 may process instructions for execution within the server 56, including instructions stored in the memory 232 or in storage 234. The memory 232 stores information within the computing device. In one implementation, the memory 232 is a volatile memory unit or units. In another implementation, the memory 232 is a non-volatile memory unit or units. Storage 234 includes capacity that is capable of providing mass storage for the server 56. Various inputs 236 and outputs 238 provide connections to and from the server 56, wherein the inputs 236 are the signals or data received by the server 56, and the outputs 238 are the signals or data sent from the server 56. The network adaptor 240 couples the server 56 to a network such that the server 56 may be part of a network of computers, a local area network (LAN), a wide area network (WAN), an intranet, a network of networks, or the Internet, for example.

The memory 232 and storage 234 are accessible to the processor 230 and include processor-executable instructions that, when executed, cause the processor 230 to execute a series of operations. In one embodiment of first processor-executable instructions, the processor-executable instructions cause the processor to receive a plurality of gateway signals from a plurality of gateway devices of the vertical and horizontal array. The processor is caused to process the plurality of gateway signals with trilateration and received signal strength modeling and determine estimated location of the proximate wireless-enabled personal location device In a second embodiment of processor-executable instructions, the processor-executable instructions cause the processor to receive a plurality of gateway signals from a plurality of gateway devices of the vertical and horizontal array. The processor is then caused to process the plurality of gateway signals with trilateration by utilizing at least three distances between at least three gateway signals from respective gateway devices to determine a point of intersection therebetween. The processor-executable instructions cause the processor to process the plurality of gateway signals with signal strength modeling by accessing the signal map stored in the storage. The process then compares a plurality of received signal strength measurements of a respective plurality of gateway signals to the signal map. The processor-executable instructions cause the processor to determine estimated location of the proximate wireless-enabled personal location device.

In a third embodiment of processor-executable instructions, the processor-executable instructions cause the processor to receive a plurality of gateway signals from a plurality of gateway devices of the vertical and horizontal array. The processor executable instructions then cause the processor to process the plurality of gateway signals with trilateration by utilizing at least three distances between at least three gateway signals from respective gateway devices to determine a point of intersection therebetween. The processor is caused to process the plurality of gateway signals with signal strength modeling by utilizing at least three received signal strength measurements between at least three gateway signals from respective gateway devices to determine a point of intersection therebetween. The process-executable instructions cause the processor to determine estimated location of the proximate wireless-enabled personal location device.

Figure 8A:
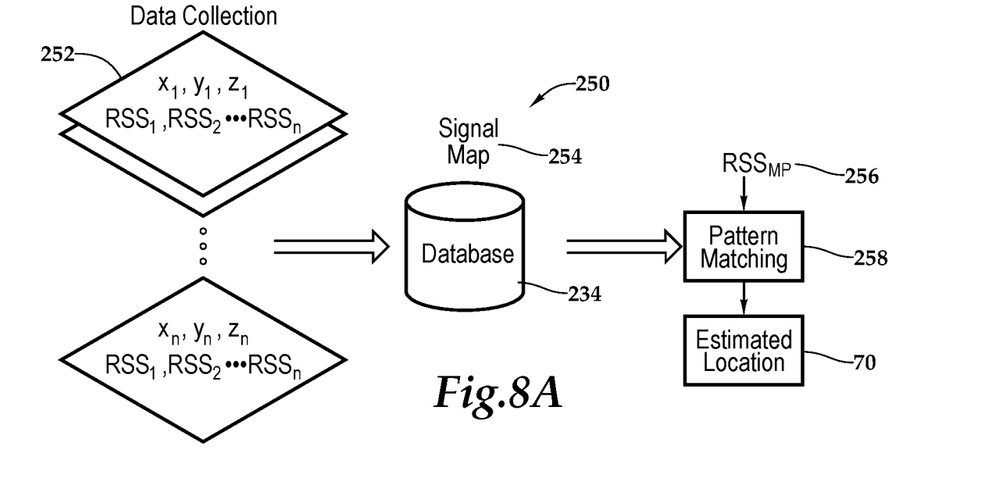
FIG. 8A is a data processing diagram depicting one embodiment of the geolocationing system according to the teachings presented herein.
Figure 8B:
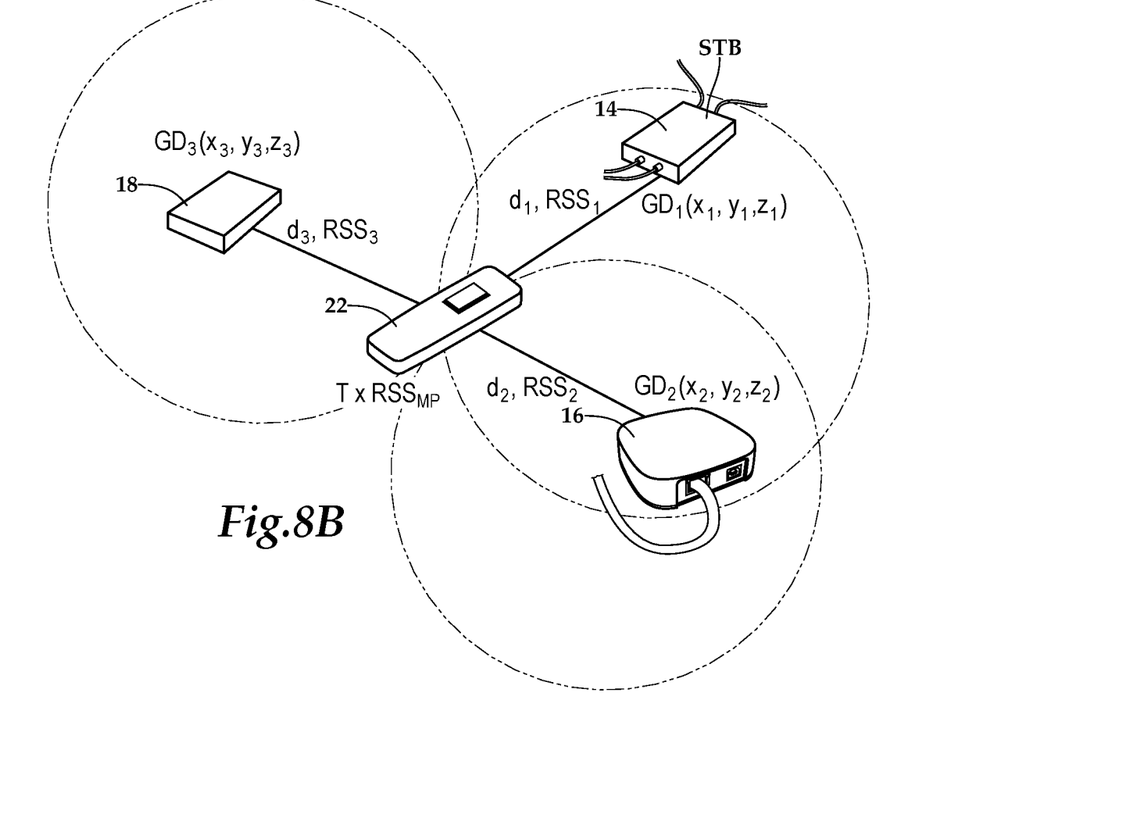
FIG. 8B is a schematic diagram depicting one embodiment of the geolocationing system presented in FIG. 8A.

Referring now to FIGS. 8A and 8B, a signal mapping 250 occurs to build a signal strength model. Data collection 250 occurs where various forms of signals are collected at the gateway devices 12 and stored in a database as a signal map which may form a portion of the storage 234. Based on the received signal strength received from multiple points at the gateway devices, an RSSmp map 256 is pattern mapped to the signal map 254 to provide an estimated location 70 of the personal locator device. More particularly, multiple gateway signals, such as RSS1 received at the gateway device GD1, RSS2 received at the gateway device GD2, and RSS3 received at the gateway device GD3, are processed with trilateration by utilizing at least three distances (e.g., d1, d2, d3) between at least three gateway signals from respective gateway devices [GD1 at accurately known fixed location (x1, y1 and z1); GD2 at accurately known fixed location (x2, y2, z2); GD3 at accurately known fixed location (x3, y3, z3)] to determine a point of intersection therebetween, which is the estimated location Tx, RSSMP. The gateway signals RSS1, RSS2, and RSS3, for example, are processed to form the RSSMP mp with signal strength modeling by accessing the signal map 254 stored in the storage. A comparison of the received signal strength measurements RSS1, RSS2, RSS3 as represented by the RSSMP to the signal map 254 to determine estimated location of the proximate wireless-enabled personal location device.

Figure 9:
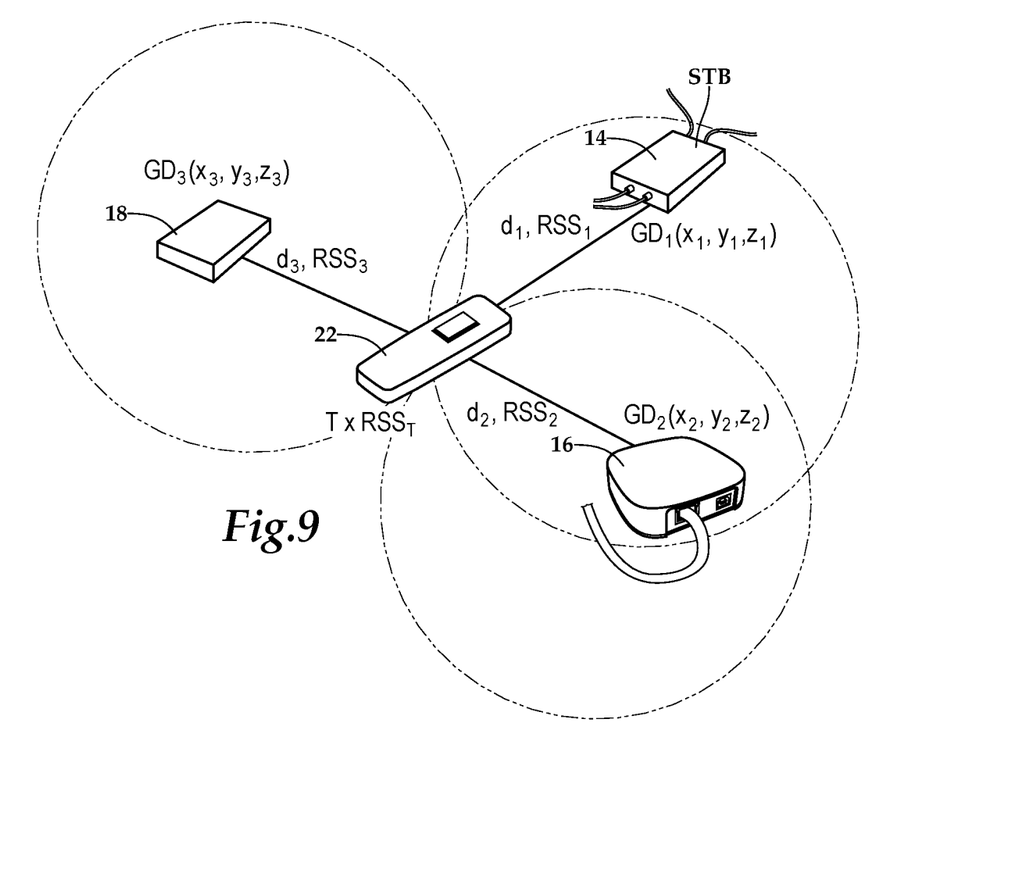
FIG. 9 is a schematic diagram depicting another embodiment of the geolocationing system presented in FIG. 8A.

In another embodiment, in FIG. 9 multiple gateway signals, such as RSS1 received at the gateway device GD1, RSS2 received at the gateway device GD2, and RSS3 received at the gateway device GD3, are processed with trilateration by utilizing at least three distances (e.g., d1, d2, d3) between at least three gateway signals from respective gateway devices [GD1 at accurately known fixed location (x1, y1 and z1); GD2 at accurately known fixed location (x2, y2, z2); GD3 at accurately known fixed location (x3, y3, z3)] to determine a point of intersection therebetween, which is the estimated location Tx, RSSMT. The gateway signals RSS1, RSS2, and RSS3, for example, are processed to determine direct measurement of the distance between the gateway device and the estimated location using received signal strength.

Figure 10:
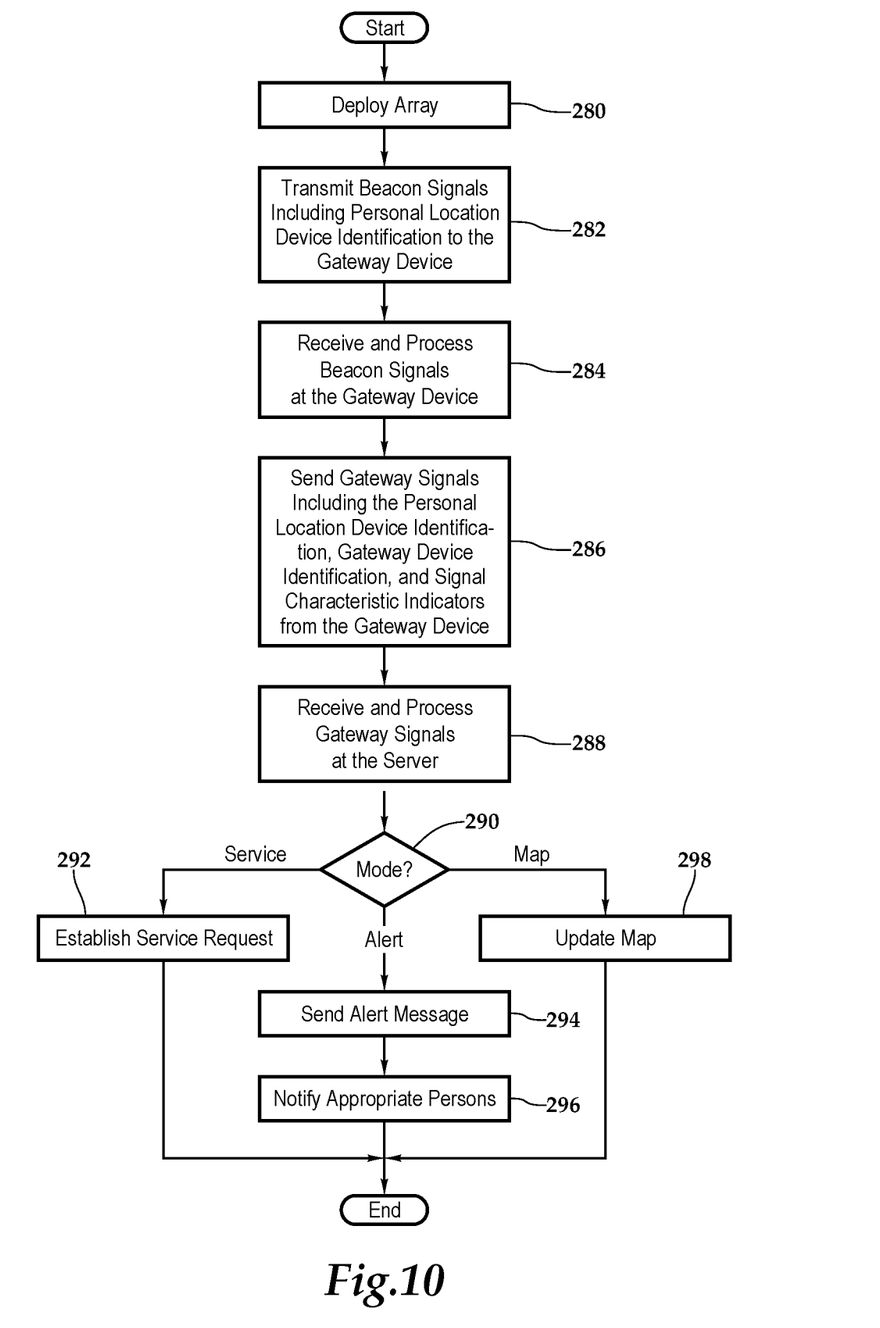
FIG. 10 is a flow chart depicting one embodiment of a method for providing a gateway device furnishing enhanced safety according to the teachings presented herein.

FIG. 10 depicts one embodiment of a method for providing safety in a hospitality environment or other environment, according to the teachings presented herein. At block 280, the array of gateway devices is deployed vertically and horizontally throughout the hospitality environment. At block 282, beacon signals are periodically transmitted from personal location devices and received by the gateway devices.

At block 284, the beacon signals are received and processed at the gateway device. The beacon signals may include a personal location device identification corresponding to the device being employed by the user. In one embodiment, signal strength between the beacon transmission of the set-top boxes and the common area beacons at the wireless-enabled interactive programmable device is measured. In other embodiments, phase angle measurements or flight time measurements may be utilized. At block 286, broadcast signals are sent from the gateway devices to a server that is part of the geolocation and safety network. The broadcast signals may include the personal location device identification, gateway device identification, and signal characteristic indicators. At block 288, the server receives and processes the broadcast signals. At decision block 290, the server takes action based on the mode of operation. In a first mode of operation at block 292, a service request is associated with the location of the user utilizing the location of the personal location device such as the wireless-enabled interactive programmable device as a proxy. In a second mode of operation at block 294, an emergency alert is sent and subsequent notification (block 296) occurs. The emergency alert includes an indication of distress and the location of the user utilizing the location of the wireless-enabled interactive programmable device as a proxy. In a third mode of operation at block 298, the map of individuals is updated with the location of the user with, if privacy settings being enabled, the system maintains the privacy of the individual working in the hospitality environment such that the system only retains in memory the last known position and time of the user-supplied wireless-enabled smart and interactive handheld device. Further, in this mode of operation, the system does not reveal the location of the individual and programmable device unless and until an alert is issued.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for providing awareness in a multi-space environment, the system comprising:
   an array of gateway devices, each gateway device being positioned within a space in the multi-space environment, each gateway device having a gateway device identification providing an accurately-known fixed location;
   a server in communication with the vertical and horizontal array of gateway devices, the server including:
   a processor, and
   a memory accessible to the processor, the memory including processor-executable instructions that, when executed, cause the processor to:
      receive a plurality of gateway signals from a plurality of gateway devices of the array of gateway devices,
      process the plurality of gateway signals, including a personal locator device identification and the gateway device identification for each of the plurality of gateway signals, with trilateration, the personal locator device identification originating from a wireless-enabled personal locator device,
      process the plurality of gateway signals, including the personal locator device identification, the gateway device identification, and a received signal strength measurement for each of the plurality of gateway signals, with received signal strength modeling, and
      determine an estimated location of the proximate wireless-enabled personal locator device.

2. The system as recited in claim 1, wherein the gateway device further comprises a plurality of wireless transceivers.

3. The system as recited in claim 1, wherein the gateway device further comprises a set-top box.

4. The system as recited in claim 1, wherein the gateway device further comprises a common space gateway device.

5. The system as recited in claim 1, wherein the gateway device further comprises a gateway service device.

6. The system as recited in claim 1, wherein the proximate wireless-enabled personal locator device further comprises a single button personal locator device.

7. The system as recited in claim 1, wherein the proximate wireless-enabled personal locator device further comprises a wireless-enabled interactive programmable device.

8. The system as recited in claim 7, wherein the wireless-enabled interactive programmable device further comprises a device selected from the group consisting of smart watches, smart phones, and tablet computers.

9. The system as recited in claim 1, wherein the server further comprises a back-office hotel server in communication with a vertical and horizontal array of set-top boxes.

10. The system as recited in claim 1, wherein the processor-executable instructions that, when executed, cause the processor to process the plurality of gateway signals with trilateration and signal strength modeling further comprise processor-executable instructions that, when executed cause the processor to:
utilize at least three distances between at least three gateway signals from respective gateway devices to determine a point of intersection therebetween.

11. The system as recited in claim 1, wherein the processor-executable instructions that, when executed, cause the processor to process the plurality of gateway signals with trilateration and signal strength modeling further comprise processor-executable instructions that, when executed cause the processor to:
access a signal map stored in the storage, the signal map being a received signal strength model of collected offline signals at the vertical and horizontal array of gateway devices, and
compare a plurality of received signal strength measurements of a respective plurality of gateway signals to the signal map.

12. The system as recited in claim 1, wherein the processor-executable instructions that, when executed, cause the processor to process the plurality of gateway signals with trilateration and signal strength modeling further comprise processor-executable instructions that, when executed cause the processor to:
utilize at least three received signal strength measurements between at least three gateway signals from respective gateway devices to determine a point of intersection therebetween.

13. The system as recited claim 1, wherein the system further comprises an operational mode selected from the group consisting of alerts-enabled, service request-enabled, tracking-enabled, and non-tracking-enabled.

14. The system as recited in claim 13, wherein in the alerts-enabled mode, the server receives a distress signal from the proximate wireless-enabled personal locator device.

15. The system as recited in claim 13, wherein in the service request-enabled mode, the server receives a service request from the proximate wireless-enabled personal locator device.

16. The system as recited in claim 13, wherein in the tracking-enabled mode, the server maintains in memory a plurality of estimated locations with timestamps associated with the proximate wireless-enabled personal locator device.

17. The system as recited in claim 13, wherein in the non-tracking-enabled mode, the server maintains in memory only the last known locations with timestamps associated with the proximate wireless-enabled personal locator device.

18. A system for providing awareness in a multi-space environment, the system comprising:
an array of gateway devices, each gateway device being positioned within a space in the multi-space environment, each gateway device having a gateway device identification providing an accurately-known fixed location;
a server in communication with the vertical and horizontal array of gateway devices, the server including:
a processor, and
a memory accessible to the processor, the memory including processor-executable instructions that, when executed, cause the processor to:
receive a plurality of gateway signals from a plurality of gateway devices of the array of gateway devices,
process the plurality of gateway signals, including the personal locator device identification, the gateway device identification, and a received signal strength measurement for each of the plurality of gateway signals, with received signal strength modeling, by accessing the signal map stored in the storage,
compare a plurality of received signal strength measurements of a respective plurality of gateway signals to the signal map, and
determine an estimated location of the proximate wireless-enabled personal locator device.

19. The system as recited in claim 18, wherein the processor-executable instructions further comprise instructions that, when executed, cause the processor to:
process the plurality of gateway signals, including a personal locator device identification and the gateway device identification for each of the plurality of gateway signals, with trilateration, the personal locator device identification originating from a wireless-enabled personal locator device.

20. A system for providing awareness in a multi-space environment, the system comprising:
an array of gateway devices, each gateway device being positioned within a space in the multi-space environment, each gateway device having a gateway device identification providing an accurately-known fixed location;
a server in communication with the vertical and horizontal array of gateway devices, the server including:
a processor, and
a memory accessible to the processor, the memory including processor-executable instructions that, when executed, cause the processor to:
process a plurality of gateway signals from a plurality of gateway devices of the array of gateway devices with trilateration, the plurality of gateway signals include a personal locator device identification and the gateway device identification for each of the plurality of gateway signals, the personal locator device identification originating from a wireless-enabled personal locator device,
process the plurality of gateway signals, including the personal locator device identification, the gateway device identification, and a received signal strength measurement for each of the plurality of gateway signals, with received signal strength modeling, and
determine an estimated location of the proximate wireless-enabled personal locator device.

* * * * *